US007907919B2

(12) United States Patent
daCosta (10) Patent No.: US 7,907,919 B2
(45) Date of Patent: *Mar. 15, 2011

(54) PREDICTING FUTURE CHANGES TO STRENGTHS OF PATHS IN MIMO SYSTEMS

(75) Inventor: Behram daCosta, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1419 days.

This patent is subject to a terminal disclaimer.

(21) Appl. No.: 11/361,587

(22) Filed: Feb. 24, 2006

(65) Prior Publication Data

US 2007/0202817 A1 Aug. 30, 2007

(51) Int. Cl.
*H03C 7/02* (2006.01)

(52) U.S. Cl. ........ 455/101; 455/102; 455/103; 455/500; 455/506; 370/339; 370/310; 375/260; 375/259

(58) Field of Classification Search ................ 455/66.1, 455/67.15, 67.7, 3.01, 3.06, 9, 10, 423–425, 455/115.1–115.4, 67.11, 67.13, 101, 102, 455/103, 500, 506; 370/334, 339, 310; 375/260, 375/259

See application file for complete search history.

(56) References Cited

U.S. PATENT DOCUMENTS

| | | | |
|---|---|---|---|
| 5,465,398 A | 11/1995 | Flammer | |
| 5,831,874 A | 11/1998 | Boone et al. | |
| 5,946,631 A | 8/1999 | Melnik | |
| 6,240,291 B1 | 5/2001 | Narasimhan et al. | |
| 6,873,937 B2 | 3/2005 | daCosta | |
| 2004/0204918 A1* | 10/2004 | daCosta | 702/189 |
| 2004/0259555 A1* | 12/2004 | Rappaport et al. | 455/446 |
| 2005/0149835 A1 | 7/2005 | Dacosta | |
| 2007/0217546 A1* | 9/2007 | Sandell et al. | 375/299 |
| 2009/0046802 A1* | 2/2009 | Subramaniam et al. | 375/267 |
| 2009/0323841 A1* | 12/2009 | Clerckx et al. | 375/260 |

OTHER PUBLICATIONS

PCT International Search Report and Written Opinion, International application No. PCT/US07/2889. Mailed Oct. 19, 2007.
Electrical Engineering Glossary Definition for MIMO, http://web.archive.org/web/20051130122826/www.maxim.ic.com/glossary/index.cfm/Ac/V/ID/967/Tm/MIMO/In/en.
Bourdoux, Andre et al., "Exploiting MIMO Technology for Optimal Performance," Mar. 31, 2005, CommsDesign.
"Getting the Most Out of MIMO: Boosting Wireless LAN Performance With Full Compatibility," Jun. 2005, Atheros Communications, Inc., Sunnyvale, California 94086.

* cited by examiner

*Primary Examiner* — Ajit Patel
*Assistant Examiner* — Khai M Nguyen
(74) *Attorney, Agent, or Firm* — Blakely, Sokoloff, Taylor & Zafman LLP (57) ABSTRACT

According to one embodiment of the invention, a system and a method for maintaining a first history of strength of a first transmission path between a first wireless node and a second wireless node in a multiple input multiple output (MIMO) communication system, maintaining a second history of strength of a second transmission path between a third wireless node and the second wireless node in the MIMO communication system, performing a spatiotemporal correlation between the first history and the second history to determine if any changes in the strength of the first transmission path is observed, and predicting future changes to strength of the second transmission path between the third wireless node and the second wireless node based on the performed special correlation between the first history and the second history.

14 Claims, 5 Drawing Sheets

PREDICTING FUTURE CHANGES TO STRENGTHS OF PATHS IN MIMO SYSTEMS

FIELD

Embodiments of the invention relates to a wireless communications, and more particularly to transmitting and receiving of wireless signals by wireless devices.

BACKGROUND

Wireless devices such as cell phones, wireless routers and radio operated devices are in widespread use today. Wireless devices enable the users to receive and transmit signals without the need for a physical connection between transmitters and receivers. This lack of physical connection increases the mobility of the wireless devices, and also decreases the overhead and inconveniences associated with use of wires, cables and other physical medium for establishing communication between two devices.

Despite the foregoing advantages, the use of wireless devices is not without shortcomings. One such shortcoming is that the transmission paths between wireless nodes in a system, such as a multi-input multi-output (MIMO) system, can be unreliable. In wireless transmission paths, fading and shadowing amongst other factors can cause the wireless signal, and hence the corresponding data rate of the transmitted signal, to vary depending on certain events. One such event is the presence of animate and inanimate objects in the environment, which may cause the quality of the data transmission to vary over space and time. The variation and lack of reliability in data transmission may cause problems for multimedia streaming applications since sudden decreases in transmission path capacity may cause noticeable artifacts to occur during display or playback of the multimedia stream.

It is thus desirable to predict the changes in transmission path capacity so as to make it easier for the multimedia source to change its output data rate to match the expected change in transmission path capacity, since the multimedia source would have more time in which to make the output rate change.

SUMMARY

An embodiment of the invention can be regarded as a method of maintaining a first history of strength of a first transmission path between a first wireless node and a second wireless node in a multiple input multiple output (MIMO) communication system, maintaining a second history of strength of a second transmission path between a third wireless node and the second wireless node in the MIMO communication system, performing a spatiotemporal correlation between the first history and the second history to determine if any changes in the strength of the first transmission path is observed, and predicting future changes to strength of the second transmission path between the third wireless node and the second wireless node based on the performed spatiotemporal correlation between the first history and the second history.

Another embodiment of the invention can also be regarded as a system which includes a memory to maintain a first history of strength of a first transmission path between a first wireless node and a second wireless node in a multiple input multiple output (MIMO) communication system, and to maintain a second history of strength of a second transmission path between a third wireless node and the second wireless node in the MIMO communication system, a spatiotemporal correlation logic to perform a spatiotemporal correlation between the first history and the second history to determine if any changes in the strength of the first transmission path is observed, and a predictor logic to predict future changes to strength of the second transmission path between the third wireless node and the second wireless node based on the performed spatiotemporal correlation between the first history and the second history.

Another embodiment of the invention can also be regarded as a machine accessible medium having instructions stored thereon that, when executed by a computing device, will cause the computing device to perform the following operations: maintain a first history of strength of a first transmission path between a first wireless node and a second wireless node in a multiple input multiple output (MIMO) communication system, maintain a second history of strength of a second transmission path between a third wireless node and the second wireless node in the MIMO communication system, perform a spatiotemporal correlation between the first history and the second history to determine if any changes in the strength of the first transmission path is observed, and predict future changes to strength of the second transmission path between the third wireless node and the second wireless node based on the performed spatiotemporal correlation between the first history and the second history.

BRIEF DESCRIPTION OF THE DRAWINGS

Embodiments of the invention may best be understood by referring to the following description and accompanying drawings that are used to illustrate embodiments of the invention.

DETAILED DESCRIPTION OF THE INVENTION

Embodiments of the invention generally relate to a system and method for predicting future changes to strengths of paths in multiple input multiple output (MIMO) communication systems. Herein, embodiments of the invention may be applicable to MIMO transmitters and receivers used in a variety of wireless devices. These wireless devices may be stationary or portable. Examples of wireless devices include, but are not limited or restricted to the following: cell phones, pagers, personal digital assistants (PDA), portable computers, handheld video game devices, routers and radio operated devices.

Certain details are set forth below in order to provide a thorough understanding of various embodiments of the invention, albeit the invention may be practiced through many embodiments other than those illustrated. Well-known logic and operations are not set forth in detail in order to avoid unnecessarily obscuring this description.

In the following description, certain terminology is used to describe features of the various embodiments of the invention. For example, the term "multi-input multi-output"

includes any device which employs multiple antennas for simultaneously transmitting or receiving the same data from the multiple antennas.

The term "software" generally denotes executable code such as an operating system, an application, an applet, a routine or even one or more instructions. The software may be stored in any type of memory, namely suitable storage medium such as a programmable electronic circuit, a semiconductor memory device, a volatile memory (e.g., random access memory, etc.), a non-volatile memory (e.g., read-only memory, flash memory, etc.), a floppy diskette, an optical disk (e.g., compact disk or digital versatile disc "DVD"), a hard drive disk, or a tape.

The term "transmission path" refers to either logical paths or physical paths, as defined below. A transmission logical path depends on the number of antennas and radios at the physical layer of the device. For example, if a MIMO system with two transmit antennas, such as T1 and T2, communicates with two receive antennas, such as R1 and R2, then there exist four transmission logical paths between the transmit antennas and the receive antennas (i.e. T1-R1, T1-R2, T2-R1, T2-R2). A transmission logical path may be further decomposed into its constituent transmission physical paths. For many wireless systems, such as those based on radio frequency (RF) wave propagation, the RF energy rarely propagates only directly from a transmit antenna to a receive antenna, such as from T1-R1. Instead, due to reflection, refraction, diffraction, RF energy may take several routes from T1 to R1. This is commonly referred to as multipath. The transmission logical path is then the combination of all propagated RF energy over all the various physical paths between T1 and R1, as measured at R1. By decomposing the received RF signal, however, such as by using the impulse response of the transmission channel, the RF signal that has propagated over the primary individual physical paths can be extracted at R1. It is therefore contemplated that the embodiments of the invention apply to transmission logical paths as well as transmission physical paths.

Figure 1:
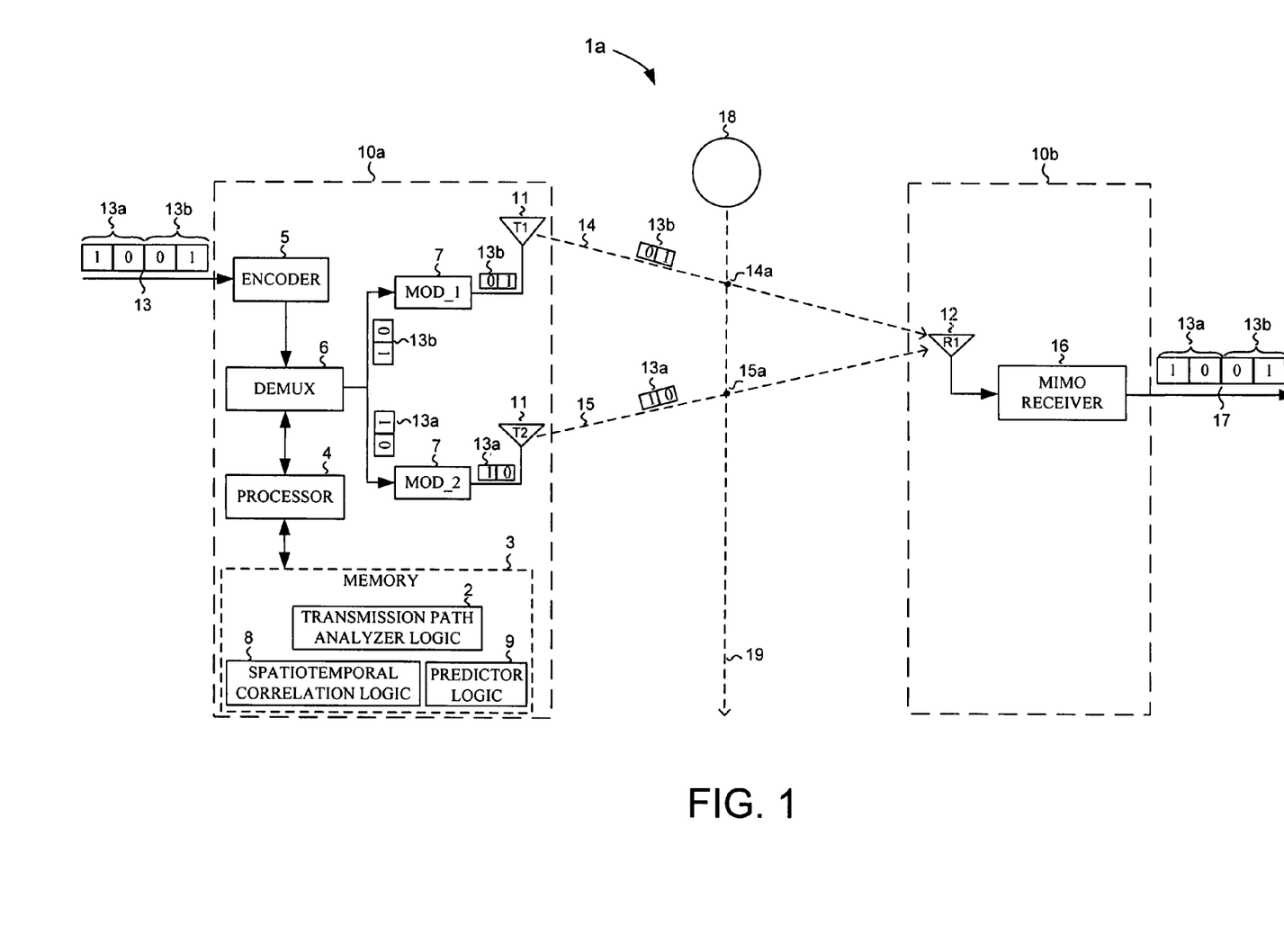
FIG. 1 is a block diagram of simplified wireless networks in which embodiments of the invention may be practiced.

With reference to FIG. 1, a block diagram of a simplified wireless network 1a is shown in which embodiments of the invention may be practiced. In an exemplary embodiment, the wireless network 1a is a multiple input multiple output (MIMO) communication system which includes a first subsystem 10a in wireless communication with a second subsystem 10b. According to this embodiment of the invention, the first subsystem 10a is a transmitter subsystem and the second subsystem 10b is a receiver subsystem. Of course it is contemplated that each or both of subsystems 10a and 10b maybe a transceiver subsystem, having transmitting and receiving capabilities.

The first subsystem 10a includes a plurality of wireless transmitter nodes 11, such as transmitter nodes T1 and T2. The second subsystem 10b includes at least one wireless receiver node 12, such as a receiver node R1. As described in greater detail in conjunction with FIGS. 3-6, the first subsystem 10a, via wireless transmitter nodes 11, transmits the contents of a data signal 13 to the wireless receiver node 12, such as via a plurality of transmission paths 14 and 15, which corresponds to the transmitter nodes T1 and T2, respectively. The second subsystem 10b then collects the data received from transmission paths 14 and 15, reassembles them in the MIMO receiver 16 and outputs the reassembled the data contents in the form of signal 17, which has the same contents as that of signal 13.

The transmission paths 14 and 15, however, may be affected by obstructions in their paths, such as inanimate obstructions such as houses, or moving obstructions such as cars, and may also be affected by interference from other wireless devices. To better illustrate the working of the embodiments of the invention, a moving obstruction 18 is used throughout the detailed description. The movement of the obstruction 18 along a path (shown by line 19) may partially or fully block the transmission paths 14 and 15, such as at intersect points 14a and 15a respectively. In an exemplary embodiment, the obstruction 18 causes one blockage at a time, so that first the transmission path 14 is blocked at intersect point 14a and then as the obstruction 18 moves along the line 19 the transmission path 14 is unblocked. Likewise, due to the continuing movement of the obstruction 18 along the line 19, the transmission path 15 is blocked at intersect point 15b at a future time and then later unblocked.

Figure 2:
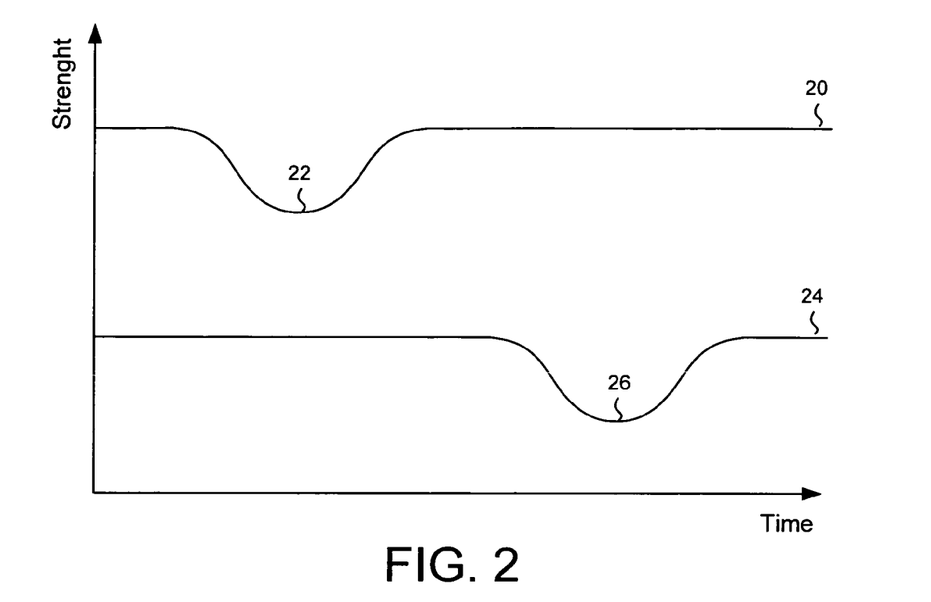
FIG. 2 is a graph of strengths of transmission paths over time in the wireless network of FIG. 1.

FIG. 2 illustrates the strength of the transmission paths 14 and 15 via lines 20 and 24 respectively. As described above, the strength of transmission paths 14 and 15 may be reduced by a moving obstruction 18. Strength of the transmission paths may be indicated by the data rate or the signal strengths between wireless nodes 11 and 12, or by other measures of the ability of the first subsystem 10a to transmit data. If the obstruction 18 is moving through the wireless network 1a along the path suggested by the line 19, the reduction in signal strength may vary over time. The line 20 in FIG. 2 shows the strength of the transmission path 14 as the obstruction 18 moves through the wireless network 1a. The "dip" 22 represents the time when the obstruction 18 is causing the greatest reduction in strength of the transmission path 14. If the obstruction 18 continues along the path suggested by the line 19, the obstruction 18 will cause a reduction in signal strength in the transmission path 15, as shown by dip 26 in line 24 representing the strength of transmission path 15. The dip 26 represents the time when the obstruction 18 is causing the greatest reduction in the strength of path 15.

It may be observed from the dips 22 and 26 shown in FIG. 2 that the reduction in strength of transmission path 14 precedes the reduction in signal strength of the transmission path 15. Thus, the reduction in signal strength of the transmission path 14 may have predictive value for a reduction in signal strength of the transmission path 15, as described in greater detail in conjunction with FIGS. 3-6.

Figure 3:
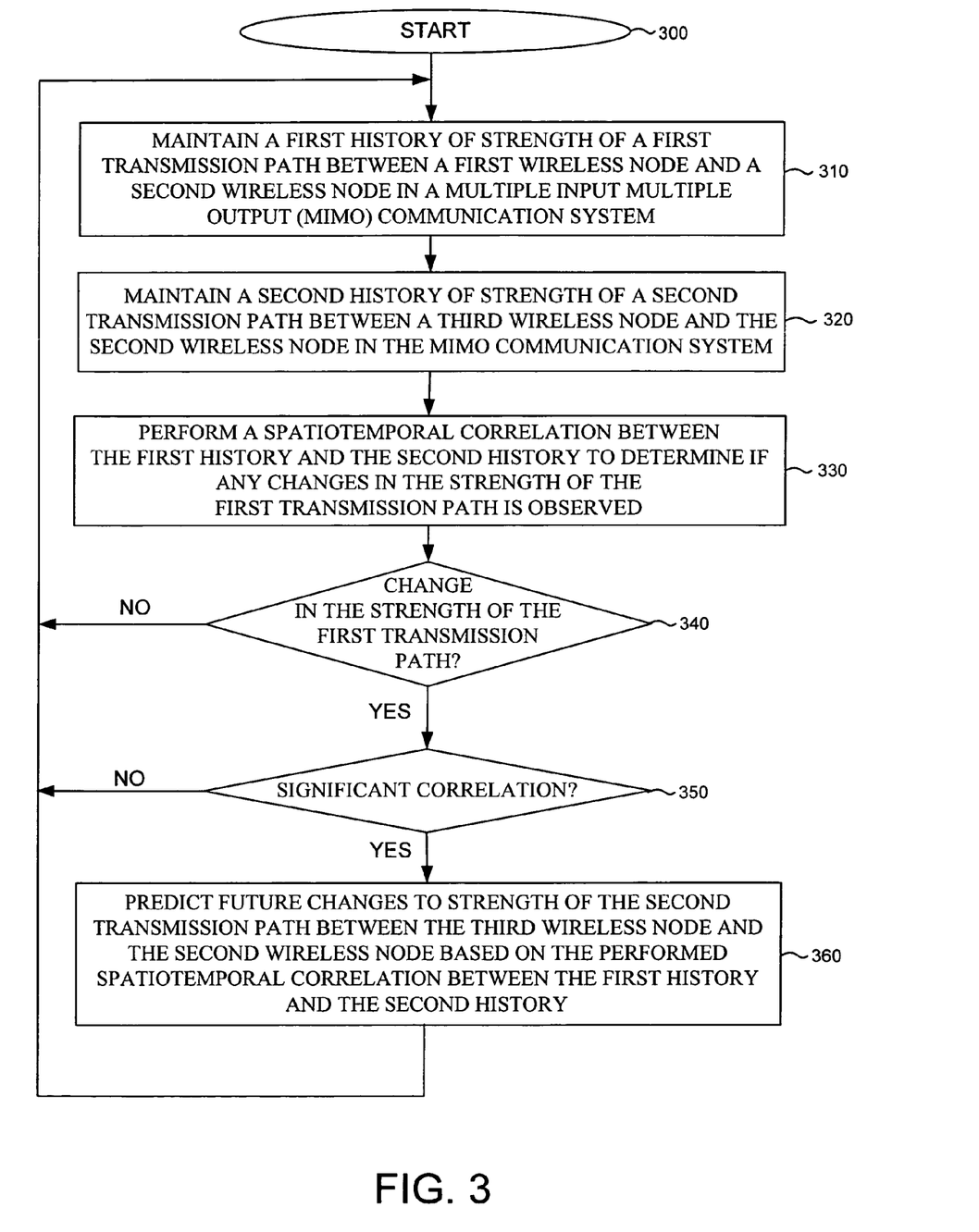
FIG. 3 is a flow chart of a method for an embodiment of the invention.

An exemplary series of operations of the wireless network 1a will now be discussed in greater detail in conjunction with FIGS. 3-6. FIG. 3 is a flow chart, which in conjunction with FIG. 1 illustrates a method of an exemplary embodiment of the invention. As shown in FIG. 3, after the operations have begun (block 300), a first history of strength of a first transmission path, such as transmission path 14 of FIG. 1, between a first wireless node and a second wireless node, such as between T1 and R1, is maintained (block 310). The first history may be stored in the memory 3. Next, a second history of strength of a second transmission path, such as transmission path 15 of FIG. 1, between a third wireless node and the second wireless node, such as between T2 and R1, is maintained (block 320). Similarly, the second history may be stored in the memory 3.

In an exemplary embodiment of the invention, the foregoing histories of the strengths of transmission paths 14 and 15 may also be maintained in a memory for a wireless node operating as a receiver, such as wireless receiver node 12. The histories of the strengths of transmission paths may also be maintained by a device (not shown) that receives the information on the strengths of transmission paths and provides predictions to the wireless nodes. The device may be part of the wireless receiver node 12 or a separate device. The histories of the strengths of transmission paths may be between a receiver node 12 and transmitter nodes 11 that transmit to the wireless receiver node 12. Suitably, a transmission path analyzer logic 2 residing in memory 3, is used to determine the strength of the transmission paths 14 and 15 from a signal strength or a data rate corresponding to each of the transmission paths 14 and 15.

Following the operations of blocks 310 and 320, a spatiotemporal correlation between the first history and the second history is performed, such as by the spatiotemporal correlation logic 8 residing in memory 3, to determine if any changes in the strength of the first transmission path is observed (block 330). This is a spatiotemporal correlation because the possible use of histories for a plurality of nodes in differing spatial relationships adds an additional functional variable to the correlation. In an exemplary embodiment of the invention, the spatiotemporal correlation performed is a continuous spatiotemporal correlation. In another exemplary embodiment of the invention, the spatiotemporal correlation performed is of pre-defined features in the strength of each of the transmission paths, such as transmission paths 14 and 15. Suitably, the pre-defined features exist in at least one of a time domain or a frequency domain.

Figure 4:
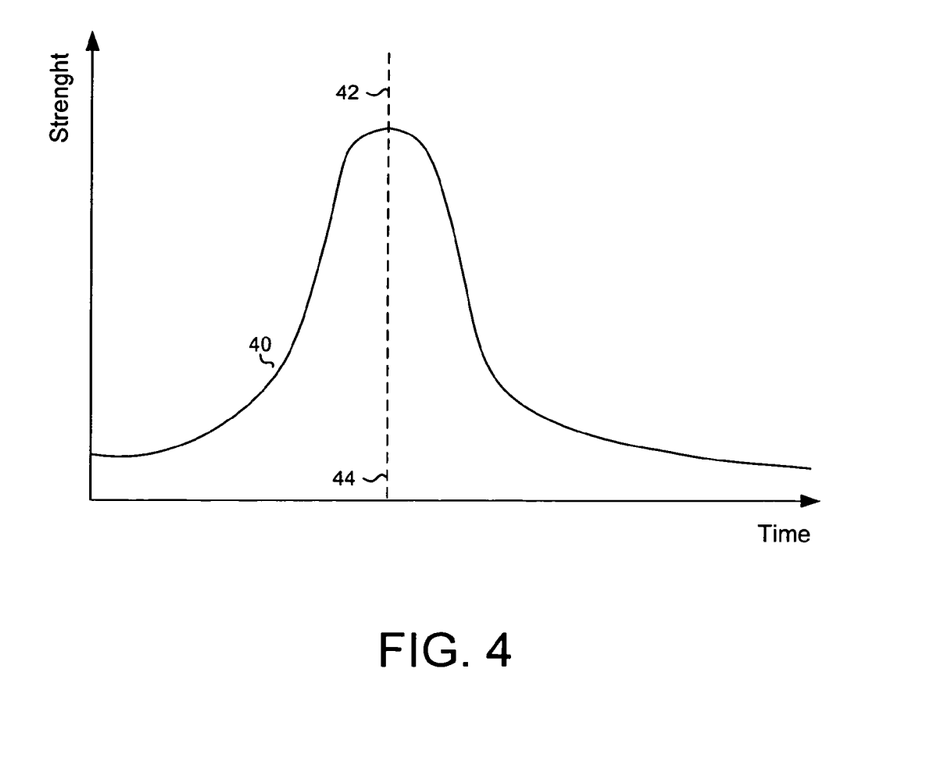
FIG. 4 is a graph of the temporal correlation between the strengths of transmission paths shown in FIG. 1.

In an exemplary embodiment of the invention, the spatiotemporal correlation is a function of the correlation between the two signals and a time shift, delta time, between the two signals. FIG. 4 qualitatively represents the temporal correlation 40 of the strengths 20 and 24 of two transmission paths 14 and 15 described above in conjunction with shown in FIG. 2. A high degree of correlation 42 between the signals, such as an absolute value approaching 1, will be found for a delta time 44 approximately equal to the time difference between the times when the dips 22, 26 (FIG. 2) occurred in the strengths 20 and 24 of two transmission paths 14 and 15.

Returning to FIG. 3, if a change in the strength of the first transmission path, such as transmission path 14 is observed (block 340), then it is determined if the spatiotemporal correlation performed resulted in a significant correlation (block 350). For example if the obstruction 18 (in FIG. 1) moved along a simple fixed path with a consistent speed profile, the temporal correlation would be a near perfect predictor for a reduction in signal strength between the transmitter T2 and the receiver R1. It will be appreciated that this is unlikely to be the case. More typically the strength of transmission path, such as transmission path 15, will be affected by a variety of obstacles moving at a variety of speeds along a variety of paths. Nonetheless, the concepts of the simplistic predictable obstruction may still be used. When there is greater variability of interfering objects, the temporal correlations between reductions in strength of transmission paths will not be as great and may tend to vary over time. Temporal correlations that are reasonably significant, for example a correlation (the absolute value of the correlation is sufficient, the sign may in most cases be ignored) above a threshold value such as 0.4, may still have a useful predictive value.

If it is determined that the spatiotemporal correlation performed resulted in a significant correlation (block 350), then future changes to strength of the second transmission path, such as transmission path 15, between the third wireless node and the second wireless node, such as between T2 and R1, is predicted based on the performed spatiotemporal correlation between the first history and the second history. Suitably, the predictions are performed by a predictor logic 9 which resides in memory 3. Following the prediction, or if no change in the strength of the first transmission path, such as transmission path 14 is observed, or if it is determined that the spatiotemporal correlation performed did not result in a significant correlation (blocks 340, 350, 360), the flow is returned to block 310.

Figure 5:
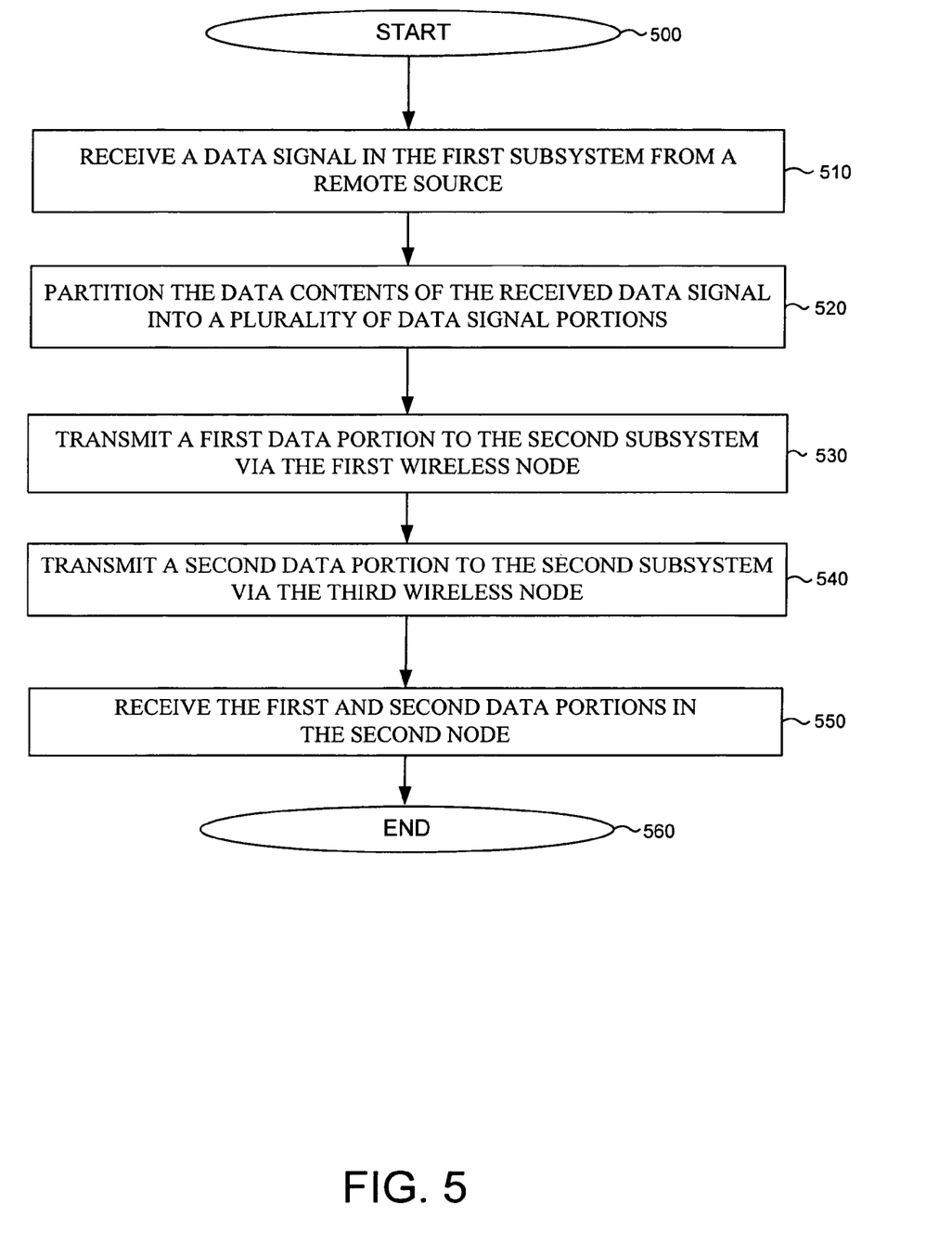
FIG. 5 is another flow chart of another method for an embodiment of the invention.

FIG. 5 is an exemplary flow chart, which in conjunction with FIG. 1, illustrates another method for an embodiment of the invention which can be used in conjunction with the above-described embodiments of the invention. As shown in FIG. 5, following the start (block 500), a data signal 13 is received in a receiver unit, such as the encoder 5, of the first subsystem 10a (FIG. 1) from a remote source (not shown). The data signal 13 is received at a predetermined transmission data rate. Next, the data contents of the received data signal 13 are partitioned, such as by the processor 4, into a plurality of data signal portions, such as data portions 13a and 13b. Suitably, the contents of the received data signal 13 are partitioned into data portions of substantially equal size.

A first data portion, such as data portion 13a is then transmitted via the demultiplexer 6, a demodulator 7, such as mod_2, and a wireless transmitter node 11, such as T2, to the second subsystem 10b via a first transmission path, such as transmission path 15 (block 530). A second data portion, such as data portion 13b is then transmitted via the demultiplexer 6, another demodulator 7, such as mod_1, and another wireless transmitter node 11, such as T1, to the second subsystem 10b via a second transmission path, such as transmission path 14 (block 540). Suitably, each data portion is transmitted at a rate that corresponds to the predetermined transmission data rate of the received signal 13 divided by the number of wireless transmitter nodes 11 used to transmit the data portions. For example, if the predetermined transmission data rate of the received signal 13 is 60 mega-bits per second (mbps), each of the data portions 13a and 13b are transmitted at a rate of at least 30 mbps. The first and second data portions, such as data portions 13a and 13b, are then received in the second subsystem 10b which reassembles them via the MIMO receiver 16 and outputs the reassembled the data contents in the form of signal 17 which has the same data portions 13a and 13b as that of signal 13. The overall flow then ends (block 560).

It will be appreciated that the embodiments of the invention can be used in wireless networks of greatly varying topologies having more nodes than shown in FIG. 1, with each of the nodes possibly taking on more than one role with respect to the embodiments of the invention. The embodiments of the invention may be used with a variety of wireless networks, such as but not limited to 802.11 radio frequency (RF) wireless networks or infrared (IR) wireless networks.

Figure 6:
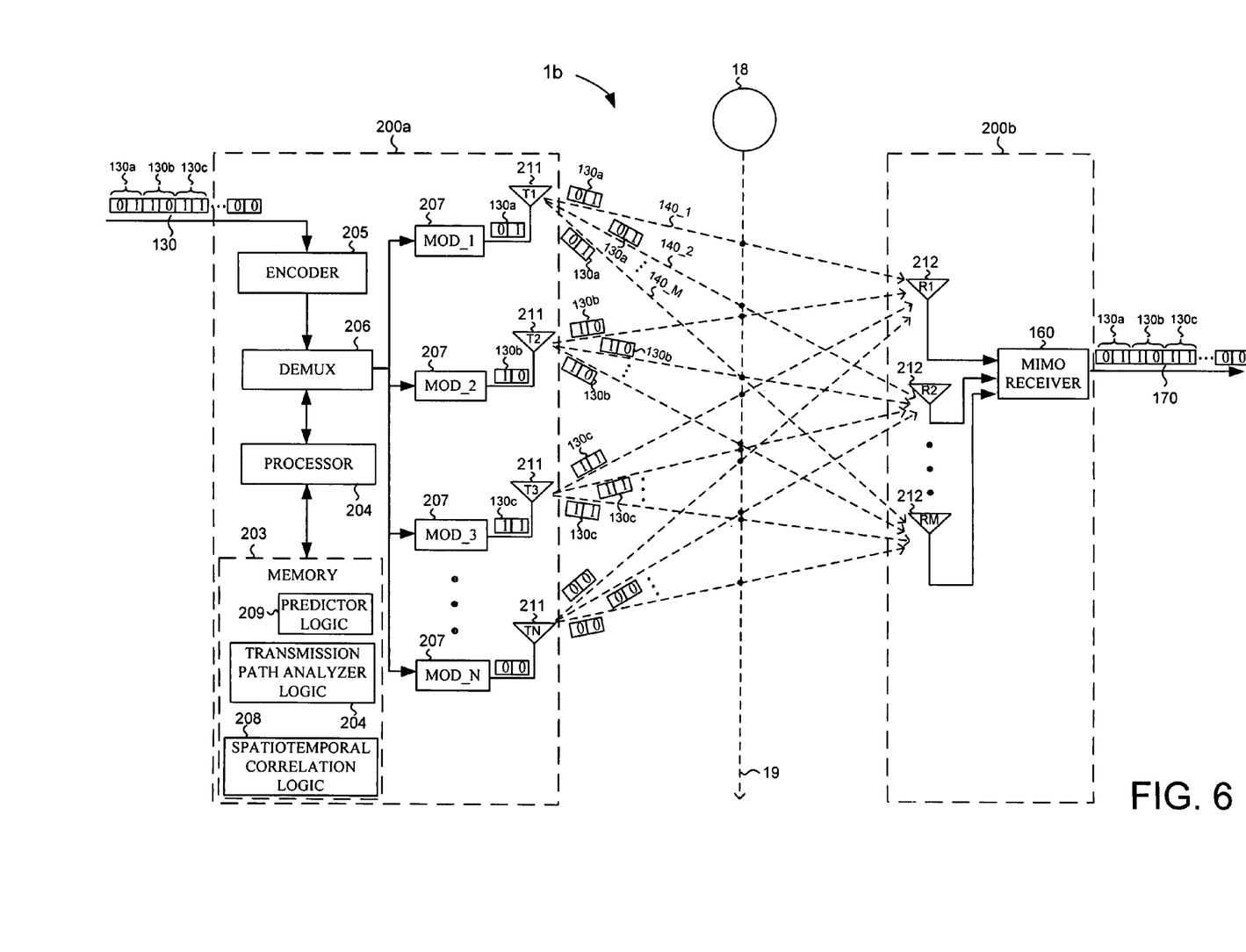
FIG. 6 is a block diagram of a more complex wireless networks in which embodiments of the invention may be practiced.

FIG. 6 is a block diagram of a more complex wireless network 1b in which embodiments of the invention may be practiced. As shown in FIG. 1B, the wireless network 1b is a multiple input multiple output (MIMO) communication system which includes a first subsystem 200a in communication with a second subsystem 200b. The first subsystem 200a is at least a wireless transmitter subsystem and the second subsystem 200b is at least a wireless receiver subsystem. The first subsystem 200a includes a plurality of wireless transmitter nodes 211, such as T1 through TN (N>1), and the second subsystem 200b which includes a plurality of receiving wireless nodes 212, such as R1 through RM (M>1). The contents of the received signal 130 is then transmitted by the wireless transmitter nodes 211 to the wireless receiver nodes 212 such that each wireless transmitter nodes 211 transmits to all of the wireless receiver nodes 212. For example, transmitter node T1 transmits the same content to each of the receiver nodes R1 through RM via transmission paths 140_1 through 140_M (M>1).

As described above in conjunction with the wireless network 1a of FIG. 1, the strength of transmission paths in the wireless network 1b, such as transmission paths 140_1 through 140_M (M>1) corresponding to T1's transmissions to R1 through RM (M>1) respectively, may be reduced by a moving obstruction 18. Applying the method described above in conjunction with FIG. 3, changes in the strengths of transmission paths (determined by the transmission path analyzer logic 2) in the path of the obstruction 18 can be predicted (such as by the predictor logic 209 residing in memory 203) based on the spatiotemporal correlation (performed by spatiotemporal correlation logic 208) between the histories of the strengths of the transmission paths of the wireless network 1b.

The method described above in conjunction with FIG. 5 may also be applied to the wireless network 1b, wherein the signal 130 is received at a predetermined transmission rate in the encoder 205, partitioned into a plurality of data portions, such as 130a, 130b, 130c or the like by the processor 204. Each of the data portions 130a, 130b, 130c or the like are then transmitted via the demultiplexer 206 and one of the modulators 207, such as one of mod_1 through mod_N (N>1) in communication with a wireless node 211, such as a corresponding one of T1 through TN (N>1) to each of the receiving wireless nodes 212 in the second subsystem, such as to R1 through RM (M>1). Suitably, the data portions are transmitted at a rate that corresponds to the predetermined transmission data rate of the received signal 130 divided by the number of wireless transmitter nodes 11 used to transmit the data portions. The data portions are then received in the second subsystem 200b which reassembles them via the MIMO receiver 160 and outputs the reassembled data contents in the form of signal 170 which has the same data portions contents and format as that of signal 130.

Another exemplary embodiment of the invention includes a machine accessible medium, such as main memory, or other storage devices such as a hard-disk (not shown) having instructions stored thereon that, when executed by a computing device, such as by the processors 4 or 204, will cause the computing device to perform the operations described above in conjunction with FIGS. 3-6.

It should be noted that the various features of the foregoing embodiments were discussed separately for clarity of description only and they can be incorporated in whole or in part into a single embodiment of the invention having all or some of these features. It should also be noted that while the embodiment of the invention were discussed in the context of a wireless systems, they may also related to non-wireless systems, such as transmissions over coaxial or other mediums.

What is claimed is:

1. A method comprising:
   maintaining a first history of path strength for a first transmission path between a first transmission wireless node and a first receiving wireless node selected from a plurality of receiving wireless nodes in a multiple input multiple output (MIMO) receiver;
   maintaining a second history of path strength for a second transmission path between the first transmission wireless node and a second receiving wireless node selected from the plurality of receiving wireless nodes in the MIMO receiver;
   performing a spatiotemporal correlation between the first history of path strength and the second history of path strength; and
   predicting future changes to strength of the second transmission path based on the performed spatiotemporal correlation.

2. The method of claim 1, further comprising:
   determining the strength of the first transmission path from at least one of a signal strength and a data rate corresponding to the first transmission path; and
   determining the strength of the second transmission path from at least one of a signal strength and a data rate corresponding to the second transmission path.

3. The method of claim 1, the performing a spatiotemporal correlation between the first history of path strength and the second history of path strength further comprising:
   performing a continuous spatiotemporal correlation between the first history of path strength and the second history of path strength to determine if any changes in the strength of the first transmission path are observed.

4. The method of claim 1, the performing a spatiotemporal correlation between the first history of path strength and the second history of path strength further comprising:
   performing a spatiotemporal correlation of pre-defined features in the strength of each of the first transmission path and the second transmission path.

5. The method of claim 4, wherein the pre-defined features exist in at least one of a time domain or a frequency domain.

6. The method of claim 1, further comprising:
   receiving a data signal in a first subsystem from a remote source, the first subsystem including a plurality of transmitting wireless nodes that includes the first transmission wireless node;
   partitioning the data contents of the received data signal into a plurality of data signal portions;
   transmitting one of the plurality of data signal portions to the MIMO receiver via only the first transmission wireless node; and
   receiving the one of the plurality of data signal portions in each of the plurality of receiving wireless nodes of the MIMO receiver.

7. A system comprising:
   a memory to maintain a first history of path strength for a first transmission path between a first transmission wireless node and a first receiving wireless node selected from a plurality of receiving wireless nodes in a multiple input multiple output (MIMO) receiver;
   the memory to further maintain a second history of path strength for a second transmission path between the first transmission wireless node and a second receiving wireless node selected from the plurality of receiving wireless nodes in the MIMO receiver;
   a spatiotemporal correlation logic to perform a spatiotemporal correlation between the first history of path strength and the second history of path strength; and
   a predictor logic to predict future changes to strength of the second transmission path based on the performed spatiotemporal correlation.

8. The system of claim 7, further comprising:
   a transmission path analyzer logic to determine the strength of the first transmission path from at least one of a signal strength and a data rate corresponding to the first transmission path, and to determine the strength of the second transmission path from at least one of a signal strength and a data rate corresponding to the second transmission path.

9. The system of claim 7, wherein the spatiotemporal correlation logic to perform continuous spatiotemporal correlation between the first history of path strength and the second history of path strength to determine if any changes in the strength of the first transmission path are observed.

10. The system of claim 7, wherein the spatiotemporal correlation logic to perform a spatiotemporal correlation of pre-defined features in the strength of each of the first transmission path and the second transmission path.

11. The system of claim 10, wherein the pre-defined features exist in at least one of a time domain or a frequency domain.

12. The system of claim 10, further comprising:
a receiver to receive a data signal in a first subsystem from a remote source, the first subsystem including a plurality of transmitting wireless nodes that includes the first transmission wireless node;
a processor to partition the data contents of the received data signal into a plurality of data signal portions;
a transmitter to transmit one of the plurality of data signal portions to the MIMO receiver via only the first transmission wireless node; and
a receiver to receive the one of the plurality of data signal portions in each of the plurality of receiving wireless nodes of the MIMO receiver.

13. A nontransitory machine accessible medium having instructions stored thereon that, when executed by a computing device, will cause the computing device to perform the following operations:
maintain a first history of path strength for a first transmission path between a first transmission wireless node and a first receiving wireless node selected from a plurality of receiving wireless nodes in a multiple input multiple output (MIMO) receiver;
maintain a second history of path strength for a second transmission path between the first transmission wireless node and a second receiving wireless node selected from the plurality of receiving wireless nodes in the MIMO receiver;
perform a spatiotemporal correlation between the first history of path strength and the second history of path strength; and
predict future changes to strength of the second transmission path based on the performed spatiotemporal correlation.

14. The nontransitory machine accessible medium of claim 13, further comprising software to:
perform a continuous spatiotemporal correlation between the first history of path strength and the second history of path strength to determine if any changes in the strength of the first transmission path are observed.

* * * * *